Feb. 22, 1966

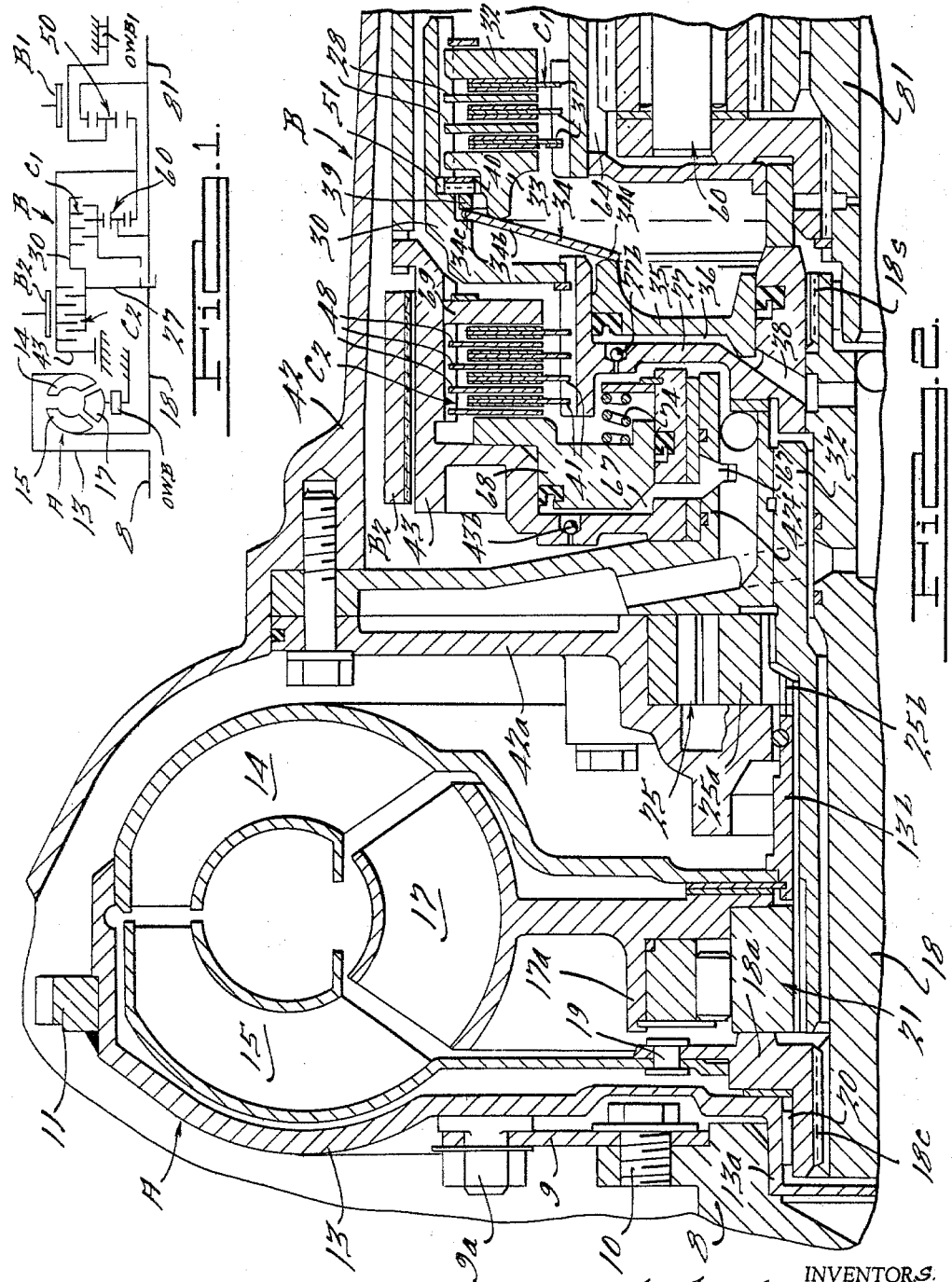

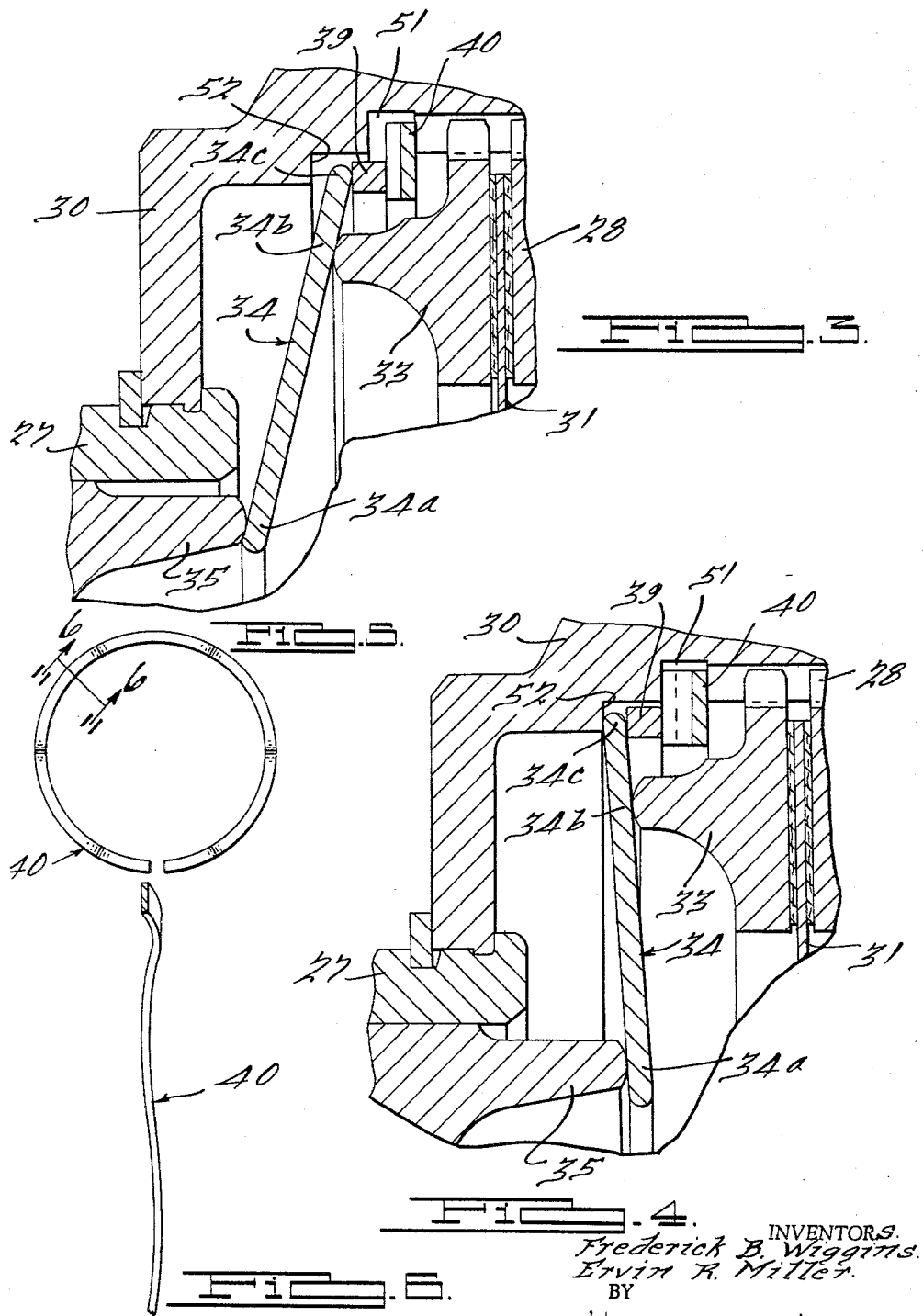

F. B. WIGGINS ETAL 3,236,349

CLUTCH MECHANISM

Filed June 10, 1963

INVENTORS.
Frederick B. Wiggins
Ervin R. Miller
BY
Harness and Harris
ATTORNEYS

United States Patent Office 3,236,349
Patented Feb. 22, 1966

3,236,349
CLUTCH MECHANISM
Frederick B. Wiggins, Farmington, and Ervin R. Miller, Detroit, Mich., assignors to Chrysler Corporation, Highland Park, Mich., a corporation of Delaware
Filed June 10, 1963, Ser. No. 286,573
7 Claims. (Cl. 192—99)

This invention relates to friction clutches or brakes and is particularly concerned with an improved means for accomplishing modulation of engagement of the friction elements of the friction clutch or brake device.

It is a primary object of this invention to provide a friction drive transmitting device having a resilient means associated therewith that provides a novel modulating means for engagement of the friction device.

It is still another object of this invention to provide a simplified form of improved modulating means for a friction device that gives both improved modulating action for engagement of the friction device and also increases the life of the modulating means and the associated friction device.

It is a further object of this invention to provide a means for achieving clutch application modulation wherein the Belleville spring washer in the clutch mechanism transmits the piston load on a direct acting basis during clutch pack closure and then the coned spring washer assumes its lever multiplication function for completion of the clutch applying action.

Other objects and advantages of this invention will become readily apparent from a reading of the following descriptions when taken in conjunction with the accompanying drawings wherein:

FIGURE 1 is a schematic line diagram of a vehicle drive train power transmission unit of the type that could advantageously embody this invention;

FIGURE 2 is an enlarged, fragmentary sectional elevational view of that portion of the transmission shown in FIGURE 1 to which this invention has been applied, the view showing both friction clutches disengaged;

FIG. 3 is an enlarged, fragmentary sectional elevational view of the forward drive clutch portion of FIG. 2 shown during the initial stages of clutch engagement;

FIG. 4 is an enlarged, fragmentary sectional elevational view similar to FIG. 3, but showing the forward drive clutch in the fully engaged condition;

FIG. 5 is a side elevational view of the wavy ring spring used in conjunction with the Belleville washer spring for transmitting engaging pressure to the forward drive clutch;

FIG. 6 is an enlarged fragmentary sectional elevational view of that portion of the ring spring included within the section line circle 6—6 of FIG. 5;

Figure 7:
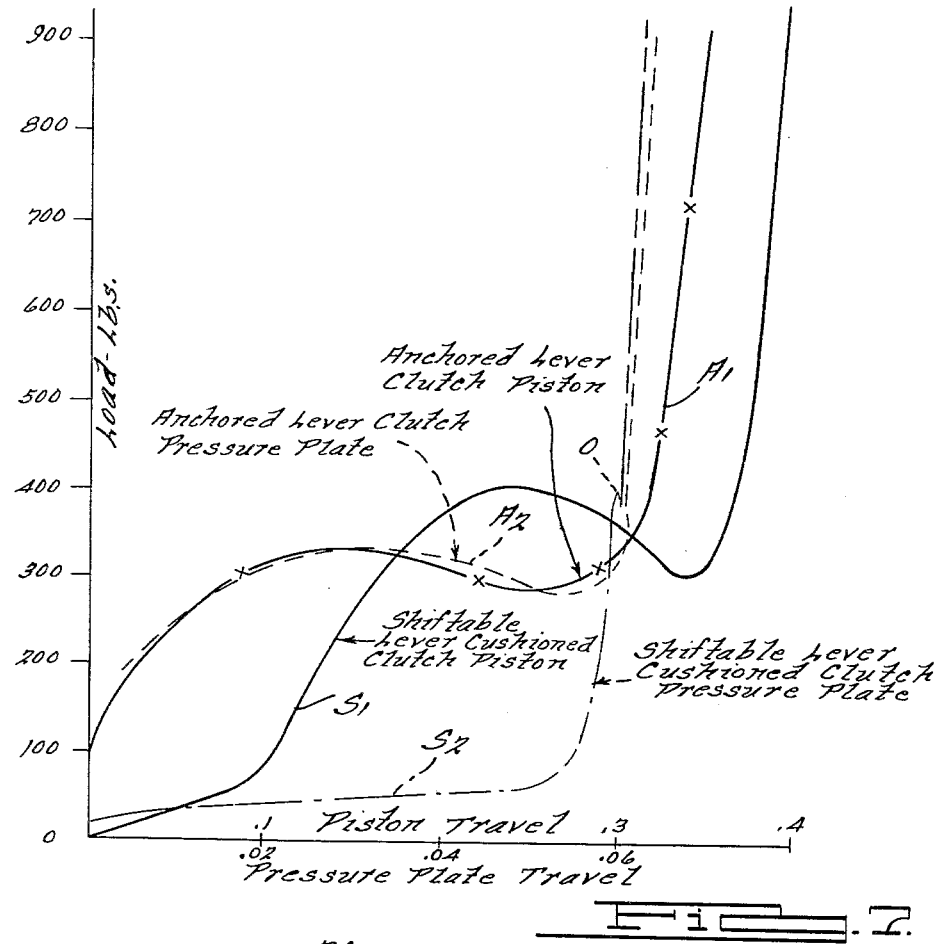
FIG. 7 is a graph showing the variation in clutch engaging pressures during a clutch application.

Before going into a description of the structure disclosed in the various figures of the drawings, it is thought that a brief statement as to the development of this particular clutch mechanism will be helpful in evaluating the advantages and the novelty of this friction device force applying mechanism. It is old in the art to use a Belleville-type spring washer as a lever means to apply or engage a plate-type friction device such as a clutch or a brake. H. T. Youngren et al. Patent 2,720,298 is representative of the prior art clutch mechanisms that have utilized a Belleville washer as a force transmitting lever in a multiple disc clutch mechanism. In prior art clutch mechanisms of the type represented by the Youngren Patent 2,720,298 it will be noted that the outer peripheral portion 42a of the Belleville-type spring washer 42 is anchored to the associated cylinder 41b such that on all clutch engaging action there is always a pivotal movement of the inner peripheral portion 42c of spring washer 42 about the anchored outer periphery 42a. Also, with the Youngren type clutch application spring washer 42, there is always a lever arm force multiplication ratio applied to the shiftable pressure plate member 43 during all clutch applying action. Because of this force multiplication due to the leverage of the Belleville-type spring washer 42, it has been found that modulated clutch engagement is difficult to achieve and often expensive and complicated devices have to be added to the clutch fluid pressure control system to give a cushioned clutch engaging action. With the particular floating arrangement of the Belleville-type spring washer 34 herein disclosed, it is possible to achieve a cushioned clutch engagement and to also materially extend the life of the Belleville-type spring washer 34 and thus the life of the associated clutch mechanism. By virtue of the limited axial movement of herein disclosed Belleville-type spring washer 34, it is possible to achieve a cushioned initiation of clutch engaging action without lever multiplied engaging force and to thereafter bring into action the lever multiplied force to complete clutch engaging action. This two stage clutch engaging action of the herein disclosed clutch is evident from FIGURE 7 that shows in graph form the difference in clutch engaging action between a prior art clutch, such as that shown in Youngren et al. Patent 2,720,298, and a clutch using a floating Belleville-type spring washer lever means as herein disclosed. Reasons for the improved engaging action and spring washer life will be more apparent after a consideration of the hereafter described clutch structure.

FIGURES 1 and 2 of the drawings disclose a power transmission unit structure that consists of the expanded hydrokinetic torque converter device A and the change speed gear box B that are arranged in a series connected drive transmitting relationship. The reference numeral 8 represents an end portion of a driving member, such as the crankshaft of the engine of the motor vehicle power plant. The shaft 8 is drivingly connected to the drive transmitting ring 9 by the screw means 10. The drive transmitting ring 9 is drivingly connected by bolts 9a to the torque converter casing 13. The converter casing 13 has an engine starter ring gear 11 mounted on and extending about its periphery. Within the torque converter casing 13 are mounted the several vaned converter wheel elements, namely, the impeller or pump member 14, the turbine or runner member 15, and the guide or reaction member 17. A pair of guide wheels may be used in place of the single guide wheel 17.

The vaned impeller wheel 14 is formed as an integral part of the converter casing 13 and is accordingly adapted to be rotatably driven by the driving shaft 8. The vaned turbine wheel 15 is drivingly connected by rivet means 19 to a radially extending flange portion formed on the shaft hub member 18a of shaft 18. Shaft hub member 18a is drivingly connected by splines 18c to the forward end portion of the torque converter driven shaft member 18.

The converter driven shaft member 18 is adapted to transmit drive from the turbine member 15 of the torque converter device A to the planetary gearing of the gear box unit B that is arranged rearwardly of and in series with the torque converter device A. The converter driven shaft 18 thus provides the input shaft to the gear box B. The forward end of shaft 18 is journalled in a bearing 20 that is piloted in an axially extending seat 13a formed in the hub of the torque converter casing 13. The rear end portion of converter driven shaft 18 is rotatably supported by the sleeve 32 that is carried by the front wall 42a of the gear box housing 42.

The vaned converter guide wheel 17 is rotatably mounted within the converter casing 13 by means of the guide wheel hub portion 17a. Guide wheel hub portion 17a is supported by means of the one-way brake device 21, on the axially extending sleeve 32 of the housing portion plate 42a. The one-way brake 21 (see FIGURE 2) is arranged such that it will permit only forward rotary movement (clockwise when looking from the converter A towards the gear box B) to be transmitted to the guide wheel 17 by the forward rotation of the impeller 14. The brake 21 continuously prevents rotation of the guide wheel 17 in a reverse or counterclockwise direction. The specific one-way brake 21 herein disclosed is shown in section in FIGURE 4 of U.S. patent 3,035,457.

The torque converter unit A includes a gear type oil pump 25 having a driving gear 25a that is directly connected by key means 25b to the rearwardly projecting end of an axially extending, sleevelike, flange portion 13b of the rotatable converter casing 13. The pump 25 draws oil from a supply sump (not shown) and circulates this oil through the converter A, the transmission unit lubricating system and the various hydraulically operated control mechanisms associated with this power transmission unit (not shown). A second pump (not shown) driven by the transmission output shaft 81, is also included in this transmission unit. The second pump (not shown) provides a second source of pressure fluid for operation of the various aforementioned hydraulically operated devices and insures a pressure fluid supply even at times when the engine driven pump 25 might not be operating. The second pump will thus provide pressurized fluid during pushed or towed starting as well as during engine driven operation of the vehicle.

The gear box B includes the forward drive clutch $C_1$, and direct drive clutch $C_2$, and the pair of planetary gear trains 50 and 60 that are adapted to cooperate with the torque converter device A to provide means for the transmission of three forward drives and a reverse drive to the output shaft 81. The forward drive clutch $C_1$ is engaged whenever any of the three forward speeds is being utilized and it is disengaged when the transmission controls are set for either Neutral or Reverse. The direct drive clutch $C_2$ is engaged only when the 3rd or Direct forward speed is being transmitted or when Reverse drive is being transmitted. The different clutches and brakes that are applied for transmitting the several drive ratios obtainable with this transmission are set forth in the chart below.

| Drive ratio: | Members applied |
|---|---|
| Low (1st) | $C_1$ and $B_1$ or $O.W.B._1$. |
| Kickdown (2nd) | $C_1$ and $B_2$. |
| Direct (3rd) | $C_1$ and $C_2$. |
| Reverse | $C_2$ and $B_1$. |

The gear box B includes the housing 42 which may be considered to include front and rear portions. In the front portion of the housing 42 are located the clutches $C_1$ and $C_2$ whereas the rear portion houses the two planetary gear sets 50 and 60. The rear end of the converter driven gear box input shaft 18 pilots the forward end of the gear box output shaft 81. Transmission input shaft 18 is drivingly connected at 18s to a spider 27 element 27. The spider element 27 carries the friction clutch disc elements 41 of the reverse and direct drive clutch $C_2$. Clutch discs 41 are adapted to be drivingly engaged with the clutch discs 48 that are drivingly connected to the interior surfaces of the brake drum 43. Brake drum 43 is journaled on the rearwardly projecting collar 42f on the gear box housing front wall 42a. A brake band $B_2$ is arranged to be selectively applied to the brake drum 43 to prevent rotation thereof. Brake drum 43 mounts a backing plate 69 that cooperates with an axially shiftable piston 68 to effect drive transmitting engagement of the clutch discs 41, 48. Springs 74 normally urge the piston 68 forwardly to clutch disengaged position. Brake drum 43 may include a ball check pressure fluid bleed valve 43b that is speed responsive and arranged to prevent unintended engagement of the clutch $C_2$ by the centrifugal action of any fluid that may be trapped in the piston bore 67. Pressure fluid for operation of the clutch $C_2$ is supplied to the piston bore 67 through the conduit 167 that is connected to a suitable fluid pressure control valve not shown.

Also drivingly mounted on the spider 27, and extending rearwardly therefrom, is a clutch drum 30. Clutch drum 30 has drivingly and shiftably mounted on its interior face the friction clutch discs 28. Clutch discs 28 are arranged to be drivingly engaged with the clutch discs 31 that are carried by the exterior surface of the annular gear 64 of the forwardly arranged planetary gear set 60. Clutch discs 28 and 31 are arranged to be drivingly compressed against the backing plate 32 by the pressure plate 33 that is actuated by the Belleville spring plate 34. Lever spring plate 34 is operated by the piston 35 that reciprocates in a cylinder bore 36 formed in the rear side of the spider 27. Pressure fluid is supplied to the cylinder bore 36 by way of the conduit 38 that is connected to a pressure fluid control valve not shown. The spider 27 may mount a pressure fluid ball check bleed valve 27b that will prevent unintended engagement of the clutch $C_1$ by centrifugal force action on any fluid that might be trapped in the cylinder bore 36.

The specific gear sets 50, 60 and their connections to the input shaft 18 and the output shaft 81 are not thought to require detailed description for an understanding of this particular invention. Furthermore, a detailed description of this gear box is set forth in Bert W. Cartwright U.S. Patent 3,035,457.

FIGURE 2 of the drawings shows the arrangement of the elements of clutch $C_1$ when this clutch is disengaged. At this time there is no effective pressurized fluid in the piston bore 36 tending to urge the piston 35 and the Belleville-type spring washer lever 34 rearwardly or towards the right. Piston 35 is in contact with the inner peripheral edge portion 34a of spring washer lever 34. An intermediate region 34b of the spring washer lever 34 is in contact with the pressure plate 33 even during clutch disengagement. The outer peripheral portion 34c of the coned spring washer lever 34 engages a snap or spacer ring 39 that is free to shift axially or fore and aft of the gear box B. Snap ring or spacer ring 39 bears against and is adapted to transmit force from the washer lever 34 to the compressible wavy spring ring 40. The spring ring 40 is shown in detail in FIGURES 5 and 6. When the clutch C is disengaged the wavy spring ring 40 extends the full width of bore step 51 in clutch drum 30 (see FIGURE 2).

Now looking at FIGURE 3, the elements of clutch C, are shown during the first stages of clutch engaging action when sufficient pressure fluid has been introduced into the cylinder bore 36 to cause closure of the clutch plate pack 28, 31. At this time the piston 35 transmits force to the inner periphery 34a of the coned washer spring 34 and moves the washer 34 to the right as a rigid lever or link. The force applied to coned washer 34 by piston 35 is directly applied to the pressure plate 33 by the portions 34b of washer 34. During this initial movement of the coned washer 34 there is no lever multiplication of the piston applied force because there is no fulcrum due to the fact that the outer peripheral portion 34c of washer 34 is shifting rightwardly and compressing the wavy spring ring 40 against one side of bore step 51 in drum 30. Wavy spring ring 40 no longer fills the full width of the bore step 51 in clutch drum 30. At about the condition shown in FIGURE 3 the wavy spring ring 40 is compressed to such a degree that further increase in clutch applying force by piston 35 causes the coned spring washer or Belleville washer 34 to flex or go overcenter and assume the position shown in FIGURE 4.

When the coned spring washer 34 assumes the position shown in FIGURE 4 then the spring ring 40 and the reaction forces of the pressure plate 33 cooperate to anchor the outer peripheral edge 34c of washer 34 against the step portion 52 of the clutch drum 30. At this time a fulcrum is provided for the ring lever 34 and lever multiplication is then available to apply the pressure plate 33 to the clutch pack 28, 31. With the elements shown this lever ratio is about 4 to 1. The particular coned washer and wavy spring combination 34, 40 herein disclosed has been found most effective in producing a smooth, cushioned or modulated, neutral-to-drive ratio transmission shift. As this is the shift that occurs most frequently at standstill and while the driving engine is often idling at fast idle, it is the shift that can be most objectionable unless it is improved in a manner such as herein disclosed. Results achieved in test vehicles incorporating this invention have been exceptionally fine in smoothing out this shift.

Not only does this combination of an axially shiftable Belleville or coned spring washer 34 with a wavy spring ring 40, or an equivalent resilient element, give an improved clutch engaging action, but in addition tests have shown that an improved or extended life is given to the Belleville washer 34 over a Belleville washer lever such as that shown in U.S. Patent 2,720,298 wherein the outer periphery of the washer is anchored against axial shifting movement. Actually an improvement of as much as forty percent (40%) has been achieved in the life of the Belleville washer 34 when it is mounted in a disc clutch or brake device in the manner herein disclosed. It is believed that this life improvement results from the fact that with the axial floating action of the washer 34 there is a reduced time of stressing of the washer and the amplitude of stressing movement of the washer is reduced over a spring washer installation having the outer periphery anchored against axial movement. With an anchored outer periphery on a Belleville washer lever, as shown at 42a in Patent 2,720,298, it is obvious that the washer 42 is stressed in bending from the very beginning until the end of clutch applying action. In contrast, with the arrangement disclosed by the applicant there is no bend stress set up in the Belleville washer 34 during the initiation of engaging action and up until after the FIGURE 3 condition has been established. During the change from the FIGURE 2 to FIGURE 3 condition the washer spring 34 transmits force from piston 35 to pressure plate 33 as a direct acting compression link or plate because of the fact that the edge 34c of washer 34 can shift axially rearwardly with the movement of the piston 35. Accordingly during this period of time there is no significant bending stresses developed in the washer 34. When the clutch pack 28, 31 has been closed up and the ring spring 40 compressed then the coned washer spring 34 swings over center to the FIGURE 4 position and now any further rearward or rightward movement of the piston 35 will bend the washer 34 about its contact at 34b with the pressure plate 33. It is believed to be clear from the foregoing that the amplitude of bending movement is reduced with the axially shiftable Belleville washer arrangement disclosed herein.

The use of the wavy ring spring 40 in combination with the axially shiftable Belleville washer 34 provides a resilient means that eliminates noise in the clutch assembly and also retracts the washer 34 and piston 35 when pressurization of piston bore 36 is relieved. This spring 40 not only cooperates with spring washer 34 in modulating the engaging action of clutch C, but in addition it functions to give a quick disengagement of clutch $C_1$ when the clutch control system depressurizes cylinder bore 36.

FIGURE 7 is a graph showing comparatively the variations in piston and pressure plate loading with accompanying travel of these clutch helmets in a clutch device having the Belleville washer spring anchored as shown in Patent 2,720,298 and a clutch device providing a cushioned or modulated engaging action wherein the Belleville washer spring is arranged for axial movement as shown by the disclosed washer 34. From a comparison of curves $A_1$ and $S_1$ it is clear how the piston travel varies with load in these two different clutch devices. Likewise, a comparison of curves $A_2$ and $S_2$ clearly shows the variation in pressure plate travel with load. Curve $S_2$ brings out the direct force application without lever arm multiplication in the axially shiftable Belleville washer construction herein disclosed. The point O on curve $S_2$ represents the point where the shiftable Belleville washer spring 34 shifts over center in going from the FIGURE 3 condition to the FIGURE 4 condition.

Figure 8:
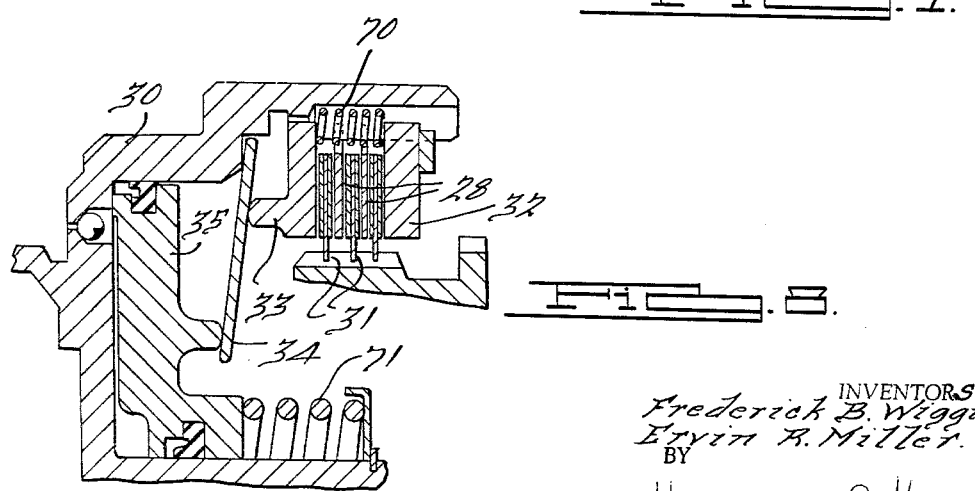
FIG. 8 is a fragmentary sectional elevation of a modified form of this invention.

FIGURE 8 shows a modified form of this invention wherein coil springs such as 70 or 71 may be substituted for the wavy spring ring 40 disclosed in FIGURES 2–6. Either springs 70 or 71 or both, may be used in combination with the axially shiftable Belleville-type spring washer 34. The operation of the spring washer 34 is the same with this modified form of the invention as with the form shown in FIGURES 2–6. Springs 70 and 71 oppose the initial clutch pack closure action and modulate clutch engagement and they also act to disengage the clutch. Also, the springs 70, as is the case with the spring 40, acts to effect a quick overcenter reversal of the outer peripheral edge portion of the spring washer 34 when the washer passes from the FIGURE 3 condition to the FIGURE 4 condition.

We claim:

1. In a clutch construction, driving and driven rotatable members and a friction element on each member arranged for relatively shiftable axial movement between a clutch engaged and a clutch disengaged position, a pressure plate mounted on one of said members for substantially axial movement and arranged for engagement with one of said friction elements to effect clutching shift thereof, a clutch operator axially shiftable between clutch engaging and clutch disengaging positions, an axially shiftable, unitary resilient washer arranged to extend between and transmit movement of said clutch operator to said pressure plate, said resilient washer having one peripheral portion engaged with said clutch operator for actuation thereby, an intermediate portion of said washer bearing against said pressure plate, and the other peripheral portion of said washer being arranged for axially shifting movement and engaged with and opposed by a resilient means seated on one of said members, said resilient means opposing clutch engaging shift of said pressure plate.

2. In a clutch construction, driving and driven rotatable members and a friction element on each member arranged for relatively shiftable axial movement between a clutch engaged and a clutch disengaged position, a pressure plate mounted on one of said members for substantially axial movement and arranged for engagement with one of said friction elements to effect clutching shift thereof, a clutch operator axially shiftable between clutch engaging and clutch disengaging positions, an axially shiftable, unitary resilient washer arranged to extend between and transmit movement of said clutch operator to said pressure plate, said resilient washer having one peripheral portion engaged with said clutch operator for actuation thereby, an intermediate portion of said washer bearing against said pressure plate, and the other peripheral portion of said washer being arranged for axially shifting movement and engaged with and opposed by a resilient means seated on one of said members, said resilient means opposing clutch engaging shift of said pressure plate and comprising a wavy resilient ring arranged for compressive engagement with said other peripheral portion of the resilient washer.

3. In a clutch construction, driving and driven rotatable members and a friction element on each member arranged for relatively shiftable axial movement between a clutch engaged and a clutch disengaged position, a pressure plate mounted on one of said members for substantially axial movement and arranged for engagement with one of said friction elements to effect clutching shift thereof, a clutch operator axially shiftable between clutch engaging and clutch disengaging positions, an axially shiftable resilient washer arranged to extend between and transmit movement of said clutch operator to said pressure plate, said resilient washer having one peripheral portion engaged with said clutch operator for axially shiftable actuation thereby, an intermediate portion of said washer arranged to bear against said pressure plate, and the other peripheral portion of said washer being arranged for axially shifting movement and engaged with and opposed by a resilient means seated on one of said members, said resilient means opposing clutch engaging shift of said pressure plate, said resilient washer being axially shiftable in one direction as a unit during initiation of clutch engagement while compressing said resilient means and bringing said friction elements into engagement after which said other peripheral portion of said resilient washer reverses direction axially and seats said other peripheral portion of said washer on one of said rotatable members whereupon clutch engaging force is thereafter transmitted from said clutch operator to said pressure plate at a lever multipled ratio.

4. In a clutch construction as set forth in claim 3 wherein said resilient washer goes overcenter when it reverses direction axially during clutch engagement.

5. In a clutch construction, driving and driven rotatable members and a friction disc element mounted on each member and arranged for shiftable axial movement thereon between a clutch engaged and a clutch disengaged position, a pressure plate shiftably mounted on one of said members for axial movement thereon and arranged for engagement with one of said friction elements to effect clutching shift thereof, a power operated clutch operator axially shiftable between clutch engaging and clutch disengaging positions, an axially shiftable, radially extending, dished resilient washer arranged to extend between and to transmit axial movement of said clutch operator to said pressure plate, said resilient washer having the inner peripheral portion engaged with said clutch operator for axially shiftable actuation thereby, an intermediate portion of said washer arranged to bear against said pressure plate, and the outer peripheral portion of said washer being axially shiftable and arranged for engagement through a compressible resilient cushion means with a seat on one of said rotatable members, said resilient cushion means carried by said one rotatable member being positioned to compressively oppose clutch engaging axial shift of said pressure plate during the initiation of clutch engagement, said resilient washer initially transmitting clutch engaging force to said pressure plate at a substantially one-to-one ratio during compression of said resilient cushion means until a predetermined clutch engaging force has been applied to said pressure plate whereupon said dished resilient washer flexes axially so as to seat its outer peripheral portion on said one rotatable member and thereafter said washer functions as a ratio multiplying lever in applying the clutch operator force to the pressure plate.

6. In a clutch construction as set forth in claim 5 wherein said dished resilient washer flexes axially overcenter when it converts from a one-to-one thrust link to a ratio multiplying lever.

7. In a clutch construction, driving and driven rotatable members and a friction element on each member arranged for relative axial movement between clutch engaged and clutch disengaged positions, a pressure plate shiftably mounted on one of said members for axial movement relative thereto and arranged for engagement with one of said friction elements to effect clutching shift thereof, a pressure fluid operated, axially shiftable, clutch operator, and an axially shiftable, dished, radially extending, resilient washer having the inner peripheral portion engageable with and actuated by said clutch operator, an intermediate portion of said resilient washer arranged to bear against and transmit force from said clutch operator to said pressure plate, and the outer peripheral portion of said resilient washer axially shiftably engaged with a compressible resilient means during initiation of clutch engaging action to modulate the initial clutch engaging action with said outer peripheral portion of said resilient washer arranged to seat upon one of said rotatable members after a predetermined axial compression of said compressible resilient means whereby said outer peripheral portion of said resilient dished washer reverses direction axially and thereafter functions as a ratio multiplying force transmitting lever to apply the clutch operator force to said pressure plate.

References Cited by the Examiner

UNITED STATES PATENTS

| 2,275,204 | 3/1942 | Smirl | 192—99 |
| 2,599,214 | 6/1952 | Wemp | 192—89 |
| 2,756,851 | 7/1956 | Collins | 192—109 |
| 2,806,568 | 9/1957 | Bliss | 192—99 |
| 3,107,766 | 10/1963 | Pritchard | 192—89 |

FOREIGN PATENTS 945,201   7/1956   Germany.

DON A. WAITE, *Primary Examiner.*

DAVID J. WILLIAMOWSKY, *Examiner.*